(12) United States Patent
Taguchi (10) Patent No.: US 8,676,468 B2
(45) Date of Patent: Mar. 18, 2014

(54) VEHICLE CONTROL DEVICE

(75) Inventor: Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/518,572

(22) PCT Filed: Dec. 22, 2009

(86) PCT No.: PCT/JP2009/071314
§ 371 (c)(1),
(2), (4) Date: Jun. 22, 2012

(87) PCT Pub. No.: WO2011/077515
PCT Pub. Date: Jun. 30, 2011

(65) Prior Publication Data
US 2012/0259527 A1    Oct. 11, 2012

(51) Int. Cl.
*B60T 7/12* (2006.01)
*G05D 1/00* (2006.01)

(52) U.S. Cl.
USPC .......................................................... 701/96

(58) Field of Classification Search
USPC ........ 701/93, 96, 98, 300, 301; 180/170, 338, 180/364, 423
See application file for complete search history.

(56) References Cited

U.S. PATENT DOCUMENTS

| 8,346,456 B2* | 1/2013 | Aleksic et al. | 701/98 |
| 2005/0256630 A1* | 11/2005 | Nishira et al. | 701/96 |
| 2012/0197497 A1* | 8/2012 | Kato | 701/48 |

FOREIGN PATENT DOCUMENTS

| JP | 8 132931 | 5/1996 |
| JP | 2001 1791 | 1/2001 |
| JP | 2004 17731 | 1/2004 |
| JP | 2006 224809 | 8/2006 |
| JP | 2008-074337 | 4/2008 |
| JP | 2008 129804 | 6/2008 |
| JP | 2008-201393 | 9/2008 |
| JP | 2009-070101 | 4/2009 |
| JP | 2009 190433 | 8/2009 |
| JP | 2009 286185 | 12/2009 |

OTHER PUBLICATIONS

International Preliminary Report on Patentability issued Aug. 16, 2012 in PCT/JP2009/071314 filed Dec. 22, 2009.
International Search Report issued on Mar. 2, 2010 in PCT/JP09/071314 filed on Dec. 22, 2009.

* cited by examiner

*Primary Examiner* — Mary Cheung
(74) *Attorney, Agent, or Firm* — Oblon, Spivak, McClelland, Maier & Neustadt, L.L.P.

(57) ABSTRACT

Provided is a vehicle control device which generates a speed pattern of a vehicle and controls traveling of the vehicle based on the speed pattern, including: rear vehicle travel situation checking means for checking a travel situation of a rear vehicle which travels behind the vehicle; wave-like travel speed pattern generating means for generating a wave-like travel speed pattern where acceleration travel and free run travel are alternately repeated based on the travel situation of the rear vehicle; and control means for controlling the traveling of the vehicle based on the wave-like travel speed pattern.

10 Claims, 8 Drawing Sheets

VEHICLE CONTROL DEVICE

TECHNICAL FIELD

The present invention relates to a vehicle control device.

BACKGROUND ART

Conventionally, as a technique in this field, for example, a travel control plan generation system disclosed in Japanese Unexamined Patent Application Publication No. 2008-129804 is known. In the travel control plan generation system, a travel control plan is configured by hierarchizing an upper level plan and a lower level plan, so that a travel policy such as the fuel consumption of a vehicle according to the upper level plan is satisfied, and the lower level plan of vehicle can be selected based on evaluation according to a predetermined index by taking into consideration the lower level plan against the neighboring vehicles. Therefore, the control of a vehicle is implemented based on an appropriate plan according to predetermined conditions.

CITATION LIST

Patent Literature

[Patent Literature 1] Japanese Unexamined Patent Application Publication No. 2008-129804

SUMMARY OF INVENTION

Technical Problem

However, in the travel control plan generation system disclosed in Patent Literature 1, for example, in the case where wave-like travel where acceleration travel and free run travel (no-acceleration travel) are alternately repeated is performed as an example of low fuel consumption travel, if there is a rear vehicle, discomfort or stress may be undesirably exerted on the rear vehicle. Accordingly, there is a problem in that the vehicle cannot perform the wave-like travel in accordance with the generated travel control plan and a travel policy such as the fuel consumption cannot be satisfied.

Therefore, an object of the invention is to provide a vehicle control device capable of achieving traveling of a vehicle with very low fuel consumption while taking into consideration the discomfort and stress of the rear vehicle by generating a wave-like travel speed pattern by checking the travel situation of the rear vehicle.

Solution to Problem

According to an aspect of the invention, there is provided a vehicle control device which generates a speed pattern of a vehicle and controls traveling of the vehicle based on the speed pattern, including: rear vehicle travel situation checking means for checking a travel situation of a rear vehicle which travels behind the vehicle; wave-like travel speed pattern generating means for generating a wave-like travel speed pattern where acceleration travel and free run travel are alternately repeated based on the travel situation of the rear vehicle; and control means for controlling the traveling of the vehicle based on the wave-like travel speed pattern.

In the aspect of the invention, the travel situation of the rear vehicle which travels behind the vehicle is checked by the rear vehicle travel situation checking means, and the wave-like travel speed pattern of the vehicle can be generated based on the travel situation of the rear vehicle. Therefore, it is possible to reduce the discomfort or stress of the rear vehicle with respect to the wave-like traveling of the vehicle, so that it is possible to achieve traveling of the vehicle with very low fuel consumption.

In the above aspect of the invention, it is preferable that the vehicle control device further include road surface gradient information acquiring means for acquiring road surface gradient information of a predetermined section where the vehicle travels, and the wave-like travel speed pattern generating means generate the wave-like travel speed pattern based on the road surface gradient information. The road surface gradient information of a predetermined travel section can be acquired by the road surface gradient information acquiring means, so that the wave-like travel is further permitted, and it is possible to achieve vehicle travel with very low fuel consumption.

In addition, in the above aspect of the invention, it is preferable that the vehicle control device further include rear vehicle type information acquiring means for acquiring type information of the rear vehicle, and the wave-like travel speed pattern generating means generate the wave-like travel speed pattern based on the type information of the rear vehicle. In some types of rear vehicles, the rear vehicle may also perform the wave-like travel. Therefore, in this case, the wave-like travel speed pattern is generated based on the type information of the rear vehicle, so that it is possible to achieve travel with very low fuel consumption with respect to the rear vehicle as well as the host vehicle.

In the above aspect of the invention, it is preferable that the vehicle control device further include rear vehicle tracking degree checking means for checking a tracking degree of the rear vehicle with respect to the vehicle based on the travel situation of the rear vehicle, and the wave-like travel speed pattern generating means determine a degree of acceleration of the acceleration travel according to the tracking degree of the rear vehicle and generate the wave-like travel speed pattern. The tracking degree of the rear vehicle with respect to the vehicle is checked, and the degree of acceleration in the acceleration travel is determined according to the tracking degree of the rear vehicle to generate the wave-like travel speed pattern, so that it is possible to further reduce the discomfort or stress of the rear vehicle, and it is possible to achieve traveling of the vehicle with very low fuel consumption.

Furthermore, in the above aspect of the invention, it is preferable that the vehicle control device further include: relative speed calculating means for calculating a relative speed between the vehicle and the rear vehicle based on the travel situation of the rear vehicle; and tracking availability determining means for determining tracking availability of the rear vehicle to the vehicle based on the relative speed, and the wave-like travel speed pattern generating means generate the wave-like travel speed pattern based on the tracking availability. The tracking availability of the rear vehicle with respect to the vehicle is determined based on the relative speed between the vehicle and the rear vehicle, and in the case where it is determined that the rear vehicle cannot follow the vehicle, the vehicle can perform the wave-like travel without taking the discomfort or stress of the rear vehicle into no consideration, so that it is possible to achieve traveling of the vehicle with very low fuel consumption.

Advantageous Effects of Invention

According to the invention, it is possible to provide a vehicle control device capable of achieving traveling of a vehicle with very low fuel consumption while taking into consideration the discomfort and stress of a rear vehicle by generating a wave-like travel speed pattern by checking the travel situation of the rear vehicle.

DESCRIPTION OF EMBODIMENTS

Hereinafter, exemplary embodiments of the invention will be described in detail with reference to the drawings.

First Embodiment

Figure 1:
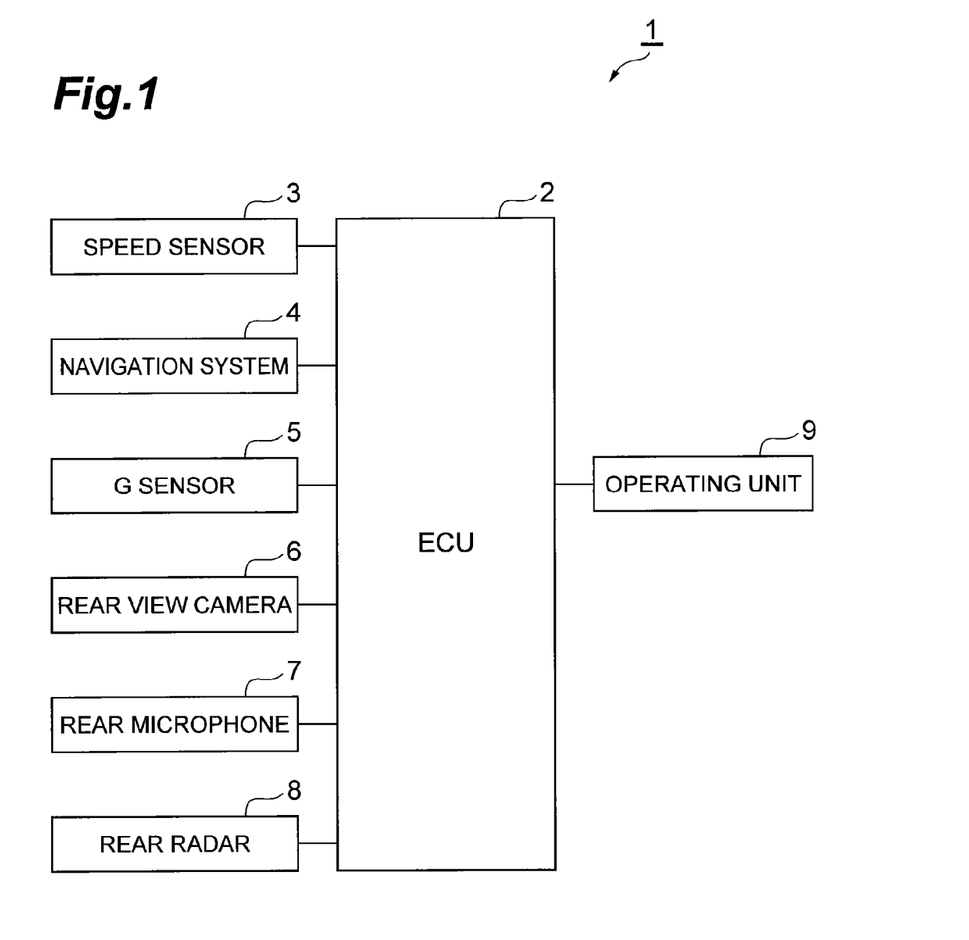
FIG. 1 is a block diagram illustrating a configuration of a vehicle control device according to an embodiment of the invention.

As illustrated in FIG. 1, a vehicle control device 1 according to an embodiment generates a wave-like travel speed pattern of a vehicle A and controls traveling of the vehicle A according to a wave-like travel speed pattern, so that low fuel consumption driving is achieved. Herein, the wave-like travel denotes a travel method capable of achieving low fuel consumption of the vehicle A over the entire time travel section by alternately repeating acceleration travel where the speed greatly increases and travel where the vehicle A travels through inertia without acceleration (hereinafter, sometimes referred to as "free run"). In the wave-like travel speed pattern, a target of speed at each point on a scheduled travel path of the vehicle A is planned so that the low fuel consumption of the vehicle A is achieved by allowing the vehicle A to perform the wave-like travel in a predetermined travel section.

The vehicle control device 1 is a device which controls traveling of the vehicle A and includes an ECU (Electric Control Unit) 2 which controls the overall device. The ECU 2 includes, for example, wave-like travel speed pattern generating means, tracking availability determining means, control means, and the like and is electrically connected to a speed sensor 3, a navigation system 4, a G sensor 5, a rear view camera 6, a rear microphone 7, a rear radar 8, and an operating unit 9.

The speed sensor 3 is speed detecting means for detecting the speed of the vehicle A. For example, the speed sensor 3 is installed at each of the four wheels of the vehicle A, so that the speed of the vehicle A is detected from the rotation speeds of the wheels. The speed sensor 3 outputs the detected speed as speed information to the ECU 2.

The navigation system 4 is route guiding means for guiding the vehicle A from the current position of the vehicle A to the destination. For example, the navigation system 4 includes a GPS receiving unit for detecting the current position of the vehicle A, map database, and the like. Road topology information on road topology or stop line information on the positions of stop lines on the road are recorded in the map database. The navigation system 4 outputs information on the current position of the vehicle A and the map data of the vicinity of the vehicle A as navigation information to the ECU 2.

The G sensor 5 is road surface gradient information acquiring means for acquiring information on the road surface gradient of the section where the vehicle A travels. For example, the G sensor 5 is a behavior observation sensor for measuring upward and downward accelerations of the vehicle A (for example, at the center of the vehicle A) and acquiring the sensor values indicating the accelerations. The G sensor 5 can measure accelerations in all directions (including gravitational acceleration) such as upward and downward directions and leftward and rightward directions of the vehicle A. After acquiring the sensor values, the G sensor 5 calculates the road surface gradient (including the angle of a gradient) based on the sensor values and outputs the road surface gradient information to the ECU 2.

The rear view camera 6 is rear vehicle type information acquiring means for acquiring the type information of the rear vehicle B. For example, the rear view camera 6 is a camera or the like using a semiconductor device such as CCD or CMOS attached to a portion capable of capturing the rear vehicle B (for example, a front portion thereof) which travels behind the vehicle A, so that a camera image of the rear vehicle B can be acquired. Data of the camera image of the rear vehicle B is output to the ECU 2, and pattern matching with respect to a known vehicle front image stored in the ECU 2 is performed, so that the type (for example, a car type) of the rear vehicle B can be determined.

The rear microphone 7 is rear vehicle type information acquiring means for acquiring type information of the rear vehicle B. For example, the rear microphone 7 is a microphone system which is attached to a rear portion of the vehicle A and can sense the sound of the rear vehicle B. The rear microphone 7 can sense the engine starting sound, high frequency sound of the inverter, or the like of the rear vehicle B during the travel. Sound data of the rear vehicle B is output to the ECU 2, and pattern matching between the sound data and known vehicle sound data stored in the ECU 2 is performed, so that the type (car type) of the rear vehicle B can be determined.

The rear radar 8 is rear vehicle travel situation checking means for checking the travel situation of the rear vehicle. For example, while scanning with a detection wave such as an electromagnetic wave in the millimeter band or a laser light beam is performed in the horizontal direction, the detection wave is emitted in the backward direction of the vehicle A, and a reflection wave reflected on a surface of the rear vehicle B is received, so that a speed of the rear vehicle B, a distance between the vehicle A and the rear vehicle B, or the like can be sensed. The speed of the rear vehicle B can be sensed by using a change in frequency of the reflection wave (Doppler effect). The distance between the vehicle A and the rear vehicle B can be sensed by using the time interval from the time when the electromagnetic wave is emitted to the time when the reflection wave returns.

The ECU 2 generates the wave-like travel speed pattern based on a variety of information acquired by the sensors 3 to 8 described above. Next, the ECU 2 outputs a command to the operating unit 9 based on the generated wave-like travel speed pattern, so that the travel control of the vehicle A is performed according to the wave-like travel speed pattern.

The operating unit 9 is configured to include a throttle actuator for controlling the throttle valve of the engine, a brake actuator for controlling a brake system, a steering actuator for controlling a steering mechanism, and the like. The operating unit 9 drives each actuator according to a command from the ECU 2. Accordingly, the traveling of the vehicle A is controlled.

A procedure of speed pattern generation according to the first embodiment of the invention will be described with reference to the flowcharts of FIGS. 2 and 3. In the speed pattern generation according to the first embodiment of the invention, a wave-like travel speed pattern for adjusting the degree (acceleration deceleration speed amplitude (acceleration/deceleration period), or the like) of wave-like traveling of the vehicle A is generated according to the stability of the travel situation (speed or inter-vehicle distance) of the rear vehicle B.

Figure 2:
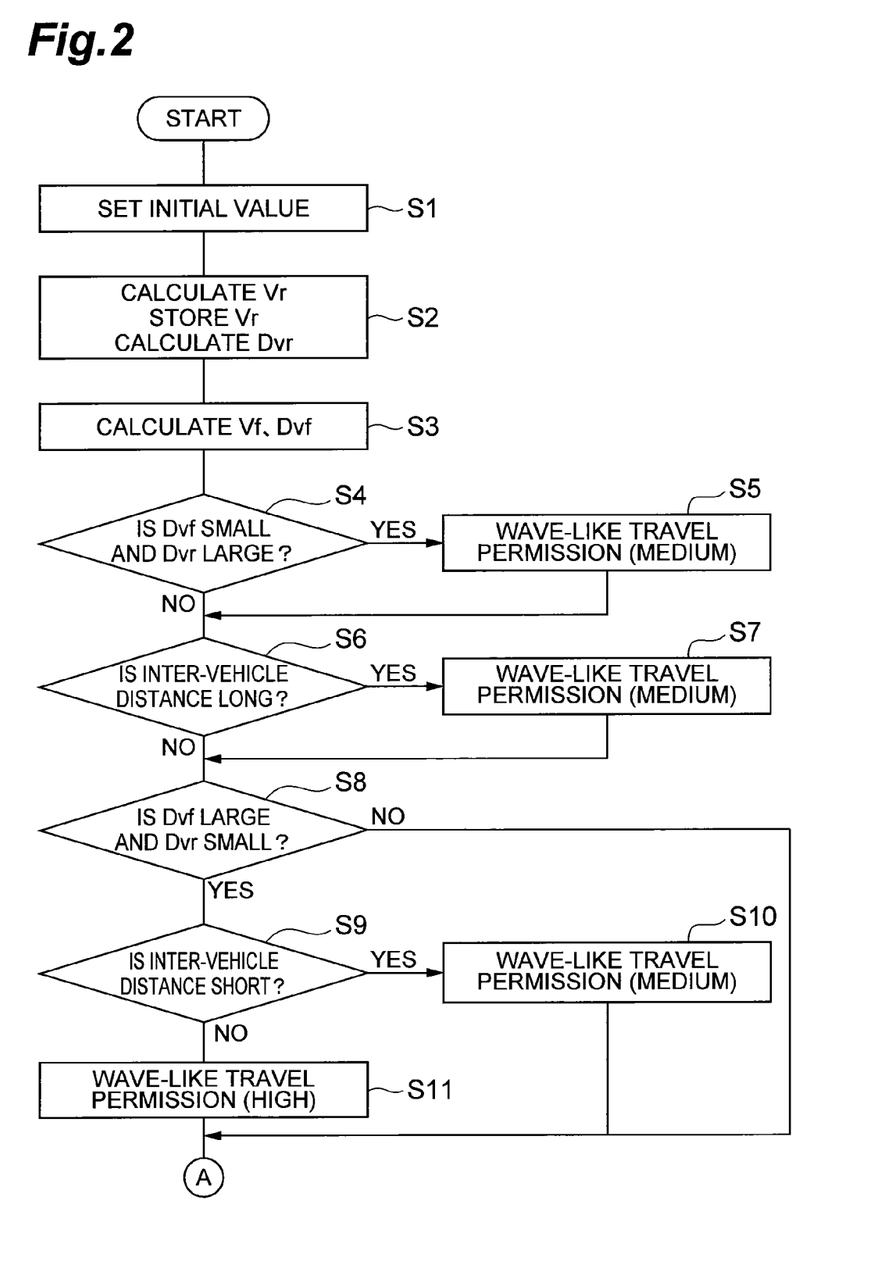
FIG. 2 is a flowchart illustrating the first half of a procedure of speed pattern generation according to a first embodiment of the invention.
Figure 3:
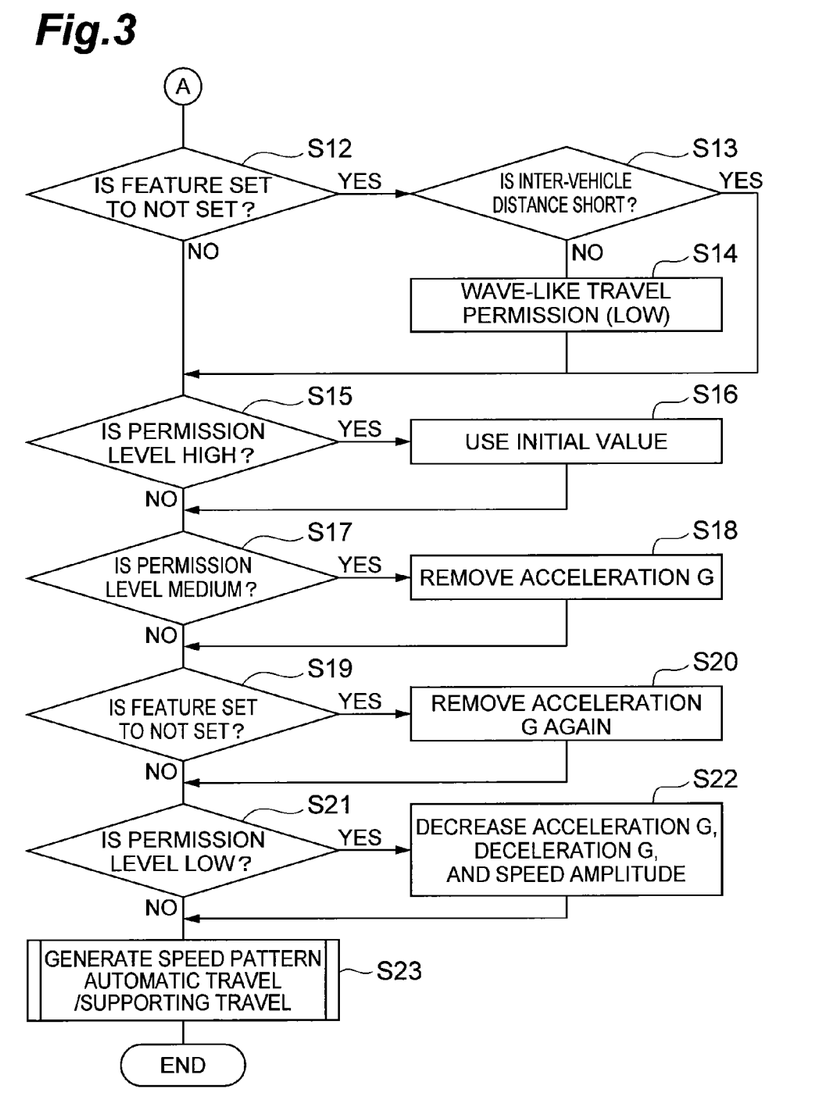
FIG. 3 is a flowchart illustrating the second half of the procedure of speed pattern generation according to the first embodiment of the invention.

First, as illustrated in FIG. 2, in Step 1, initial values of the wave-like traveling of the vehicle A are set. The initial values are set with respect to, for example, acceleration G (for example, 0.15 G), deceleration G (for example, −0.02 G), and speed amplitude (for example, ±10 km/h). The acceleration G is calculated, for example, from a driving force where the heat efficiency of the engine of the vehicle A becomes maximized. In addition, if the acceleration G, the deceleration G, and the speed amplitude are set, the acceleration/deceleration period [Speed Amplitude (m/s)×2/(Acceleration G×9.8)+Speed Amplitude (m/s)×2/(Deceleration G×9.8)] is also temporarily calculated. The feature of the rear vehicle B is set to "standard (not set)".

In Step 2, the speed of the rear vehicle B is processed. Firstly, the speed (Vr) of the rear vehicle B at each time point is calculated by using the speed sensor 3 and the rear radar 8. The relative speed of the rear radar is a differential of the inter-vehicle distance when the approaching direction is set to minus (−).

$$Vr = \text{Speed } (V\!f) \text{ of Vehicle } A - \text{Relative Speed of Rear Radar}$$

Next, the Vr at each point is stored in the ECU 2 for a predetermined time (for example, 1 minute). Next, in the ECU 2, a standard deviation (Dvr) of Vr is calculated according to a general statistical process. In Step 3, similarly to Step 2, a history of the Vf and the standard deviation (Dvf) thereof are calculated.

In Step 4, it is determined whether or not the Dvf is less than a setting value and the Dvr is more than a setting value. In the case where the Dvf is less than the setting value (for example, 5 km/h or less) and the Dvr is more than the setting value (for example, 10 km/h or more), it is considered in Step 5 that the rear vehicle B is not a stably traveling vehicle, so that the feature of the rear vehicle B is set to the "wave-like travel permission (medium)". In this case, since the rear vehicle B is an unstably traveling vehicle, much concern to the vehicle A is unnecessary. However, the unstably traveling vehicle causes the wave-like traveling of the vehicle A, and a great change in speed of the rear vehicle B is likely to occur, so that the "wave-like travel permission (medium)" is set.

In Step 6, it is determined whether or not the inter-vehicle distance between the vehicle A and the rear vehicle B is more than a setting value. For example, in the case where the distance between the vehicle A and the rear vehicle B is long, to the extent that the inter-vehicle distance corresponds to two seconds, although influence of the wave-like traveling of the vehicle A on the rear vehicle B seems to be small, the influence of the long inter-vehicle distance is also considered, and thus, in Step 7, the "wave-like travel permission (medium)" is set.

Next, in Step 8, it is determined whether or not the Dvf is more than a setting value and the Dvr is less than a setting value. In the case where the Dvf is more than the setting value (for example, 10 km/h or more) and the Dvr is less than the setting value (for example, 5 km/h or less), the rear vehicle B is considered to be a stably traveling vehicle or a cruise control car which cannot be easily affected by the wave-like traveling of the vehicle A, and thus, in Step 11, the "wave-like travel permission (high)" is set. In the case where it is determined in Step 9 that the inter-vehicle distance between the vehicle A and the rear vehicle B is extremely short, for example, less than one second, or the like, in Step 10, the "wave-like travel permission (medium)" is set. In Step 8, in the case where it is determined that the Dvr is less than the setting value, the procedure skips to Step 12.

In Step 12, it is determined whether or not the "standard (not set)" is set. In the case where it is determined that the "standard (not set)" is set in Step 13, it is determined whether or not the inter-vehicle distance between the vehicle A and the rear vehicle B is less than a setting value. In the case where the inter-vehicle distance is short, for example, less than 1 second, in Step 14, the "wave-like travel permission (low)" is set.

Next, the wave-like travel speed pattern condition is set according to the following process. Firstly, in Step 15, it is determined whether or not the "wave-like travel permission (high)" is set. In the case where the "wave-like travel permission (high)" is set, in Step 16, it is determined that sufficient wave-like travel can be performed, so that the initial values set in Step 1 are used.

In Step 17, it is determined whether or not the "wave-like travel permission (medium)" is set. In the case where the "wave-like travel permission (medium)" is set, in Step 18, it is determined that it is necessary to suppress the wave-like travel, and thus, the acceleration G is allowed to decrease from the initial value set in Step 1 (for example, 0.10 G).

In Step 19, it is determined whether or not the "standard (not set)" is set. In the case where the "standard (not set)" is set, in Step 20, it is determined that it is necessary to further suppress the wave-like travel, and thus, the acceleration G is allowed to more greatly decrease from the initial value set in Step 1 than the acceleration G decrease in Step 18. For example, the acceleration G is a driving force of 0.07 G just before the heat efficiency greatly decreases (for example, 0.25) from the maximum heat efficiency (for example, 0.36), and the speed amplitude is also allowed to decrease (for example, ±7 km/h).

In Step 21, it is determined whether or not the "wave-like travel permission (low)" is set. In the case where the "wave-like travel permission (low)" is set, in order to perform the wave-like travel to a minimum, in Step 22, the acceleration G is allowed to decrease, for example, down to 0.05 G; the deceleration G is also allowed to decrease, for example, down to −0.01 G; and the speed amplitude is also allowed to decrease, for example, down to ±5 km/h.

In Step 23, the wave-like travel speed pattern is generated based on the aforementioned settings by using a general optimization processing technique or the like, and the automatic travel or the supporting travel for the wave-like travel is performed based on the generated wave-like travel speed pattern.

Second Embodiment

A procedure of speed pattern generation according to a second embodiment of the invention will be described with reference to a flowchart in FIGS. 4 and 5. The configuration of the vehicle control device according to the second embodiment of the invention is the same as that of the first embodiment illustrated in FIG. 1. In the speed pattern generation according to the second embodiment of the invention, the wave-like travel speed pattern where the degree (acceleration G, deceleration G, speed amplitude (acceleration/deceleration period), and the like) of wave-like traveling of the vehicle A is adjusted according to road surface gradient is generated.

Figure 4:
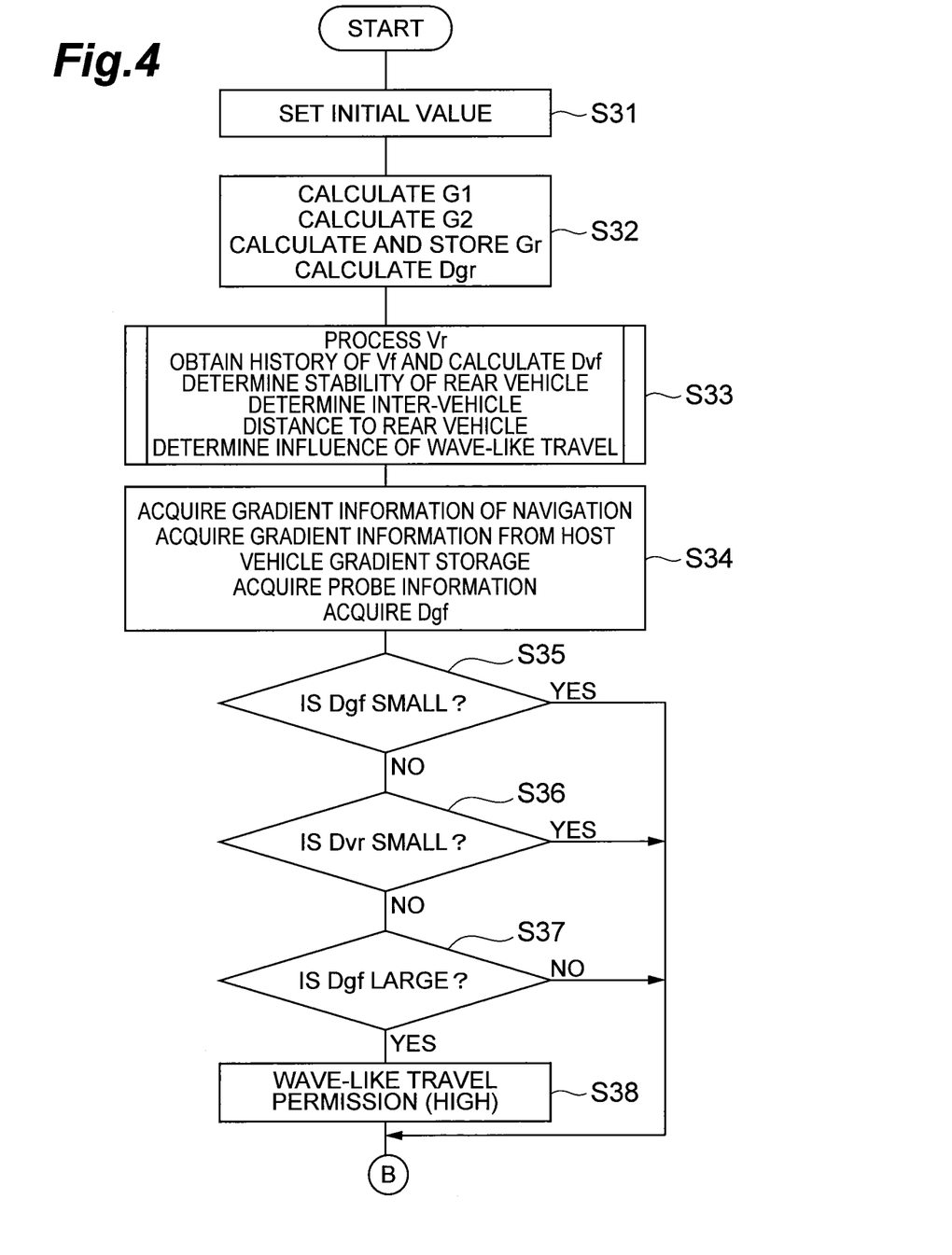
FIG. 4 is a flowchart illustrating the first half of a procedure of speed pattern generation according to a second embodiment of the invention.

First, as illustrated in FIG. 4, in Step 31, similarly to Step 1 in FIG. 2, initial values of the wave-like travel are set.

Next, in Step 32, the road surface gradient is acquired at each time point. For example, after an acceleration sensor value is acquired by the G sensor 5, calculation of the road surface gradient (including the angle of a gradient) is performed based on the sensor value, and road surface gradient information is output to the ECU 2, so that an estimated value of gradient (G1 (%)) may be obtained in the ECU 2. In addition, data about a driving force, rolling resistance, air loss, and a change in speed of vehicle are acquired, and the road surface gradient is calculated by using physical laws in the ECU 2, so that an estimated value of gradient (G2 (%)) may be obtained. Any available one of the G1 and the G2 or the average value thereof is set as estimated gradient (Gr), and the Gr at each time point is stored for a predetermined time (for example, 1 minute). In addition, the standard deviation (Dgr) of Gr is also calculated by a statistical process in the ECU 2.

In Step 33, similarly to Steps 2 and 3, the Vr is processed, and the history of the Vf and the Dvf are obtained. In addition, similarly to Step 4, the travel stability of the rear vehicle B is determined, and similarly to Step 6, the inter-vehicle distance between the vehicle A and the rear vehicle B is determined. Furthermore, similarly to Step 8, influence of wave-like travel on the rear vehicle B is also determined.

In Step 34, the road surface gradient information of the position ahead of the vehicle A (for example, 300 m ahead) is acquired. Firstly, the road surface gradient information included in the navigation system 4 is acquired. In addition, the road surface gradient (calculated in the same manner as Step 32) acquired by the sensor of the vehicle A when the vehicle A traveled the point previously is acquired from the storage device (hard disk drive (HDD) or the like of the navigation system 4) of the vehicle A. Since the road surface gradient information acquired by ordinary vehicles in this manner is concentrated on a center by using telematics, the road surface gradient information may be acquired as probe information by the vehicle A. For example, the deviation of gradient (Dgf) of the position 300 m ahead is acquired from the road surface gradient information.

In Steps 35 to 37, the response capability of the rear vehicle B against the road surface gradient is evaluated, and thus, the degree of the wave-like travel permission is determined. Firstly, in Step 35, in the case where the Dgf is less than the setting value, for example, less than 3%, it is considered that the road surface gradient in the vicinity thereof is almost constant, so that the response capability of the rear vehicle B against the road surface gradient cannot be evaluated. Therefore, the procedure skips to Step 39. In Step 36, in the case where the Dvr is less than the setting value, although there is a gradient to the road surface, a normal speed is maintained, and thus, it is considered that the response capability against the road surface gradient is high. Therefore, the procedure skips to Step 39. On the other hand, in Step 37, in the case where the Dgf is more than the setting value, for example, 3% or more, it is considered difficult to maintain the normal speed of the rear vehicle B irrespective of the preceding vehicle, and thus, in Step 38, the "wave-like travel permission (high)" is set.

Figure 5:
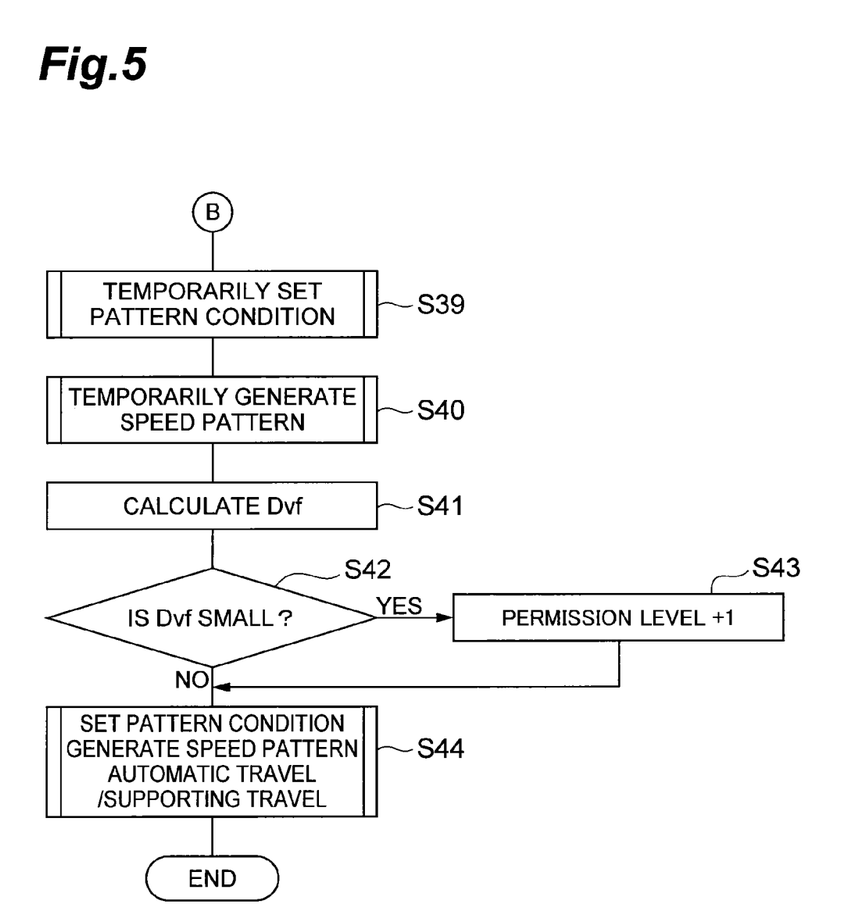
FIG. 5 is a flowchart illustrating the second half of the procedure of speed pattern generation according to the second embodiment of the invention.

Next, speed pattern generation based on prediction of a change in speed of the vehicle A is illustrated by Steps 39 to 44 in FIG. 5. In Step 39, similarly to Steps 15 to 22, a wave-like travel speed pattern condition is temporarily set. In addition, in Step 40, similarly to Step 23, a temporary speed pattern is generated.

In Step 41, the standard deviation (Dvf) of speed at a position, for example, 300 m ahead is calculated from the temporary speed pattern of Step 40. In Step 42, in the case where the Dvf is less than the setting value, for example, 5 km/h or less, it is considered the wave-like travel finally decreases due to the road surface gradient, the wave-like travel speed pattern condition, or the like. Therefore, in Step 43, the level of wave-like travel permission increases by one level, for example, from the "wave-like travel permission (medium)" to the "wave-like travel permission (high)".

In Step 44, similarly to Steps 15 to 22, a wave-like travel speed pattern condition is set. In addition, similarly to Step 23, the speed pattern is generated, and the automatic travel or the supporting travel is performed.

Third Embodiment

A procedure of speed pattern generation according to a third embodiment of the invention will be described with reference to a flowchart of FIGS. 6 and 7. The configuration of a vehicle control device according to a third embodiment of the invention is the same as that of the first embodiment illustrated in FIG. 1. In the speed pattern generation according to the third embodiment of the invention, the wave-like travel speed pattern where the degree (acceleration G, deceleration G, speed amplitude (acceleration/deceleration period), and the like) of wave-like traveling of the vehicle A is adjusted according to the type of the rear vehicle B is generated.

Figure 6:
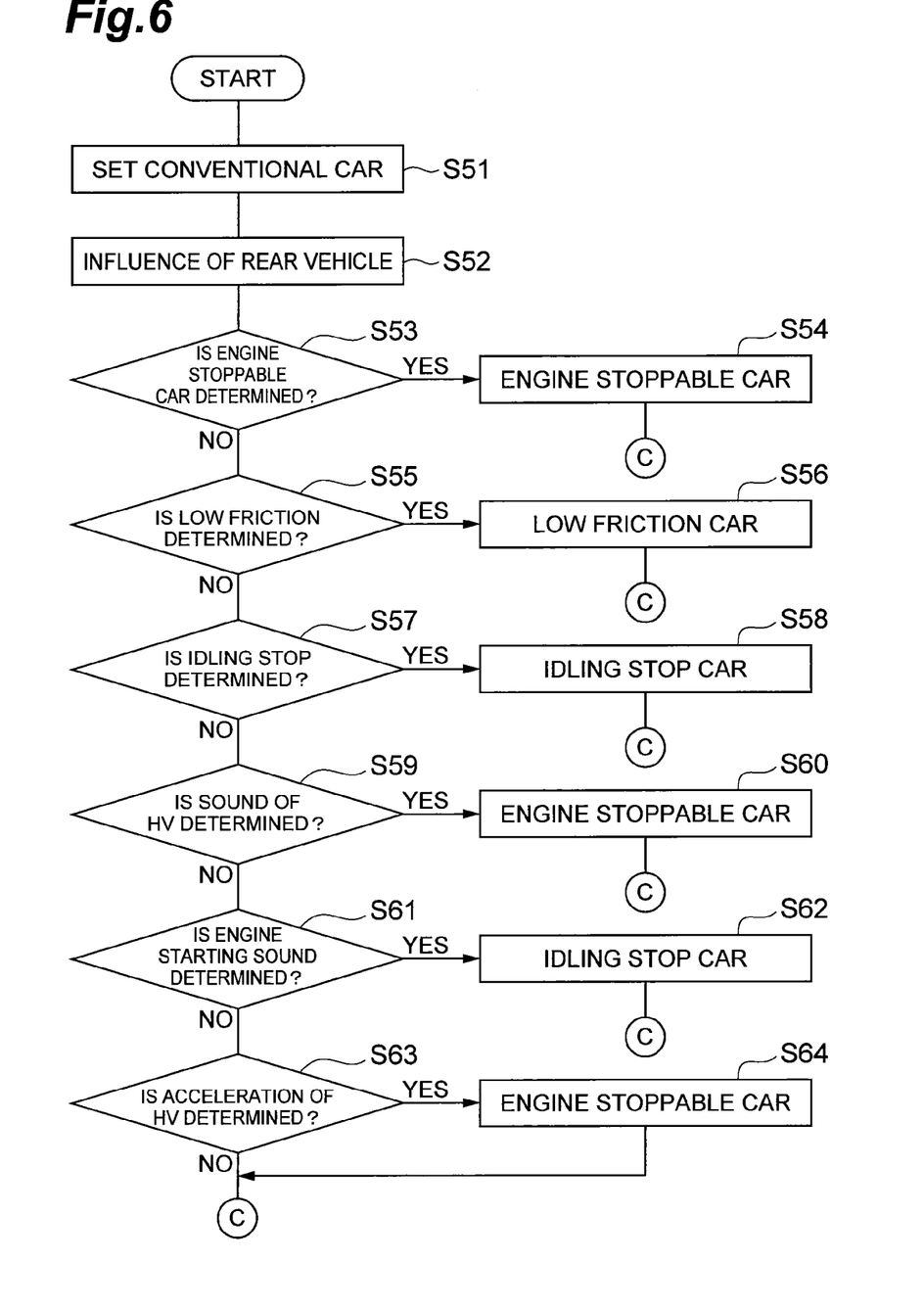
FIG. 6 is a flowchart illustrating the first half of a procedure of speed pattern generation according to a third embodiment of the invention.

First, as illustrated in FIG. 6, in Step 51, a rear-vehicle estimated value (BX) is set to a general AT, CVT vehicle (hereinafter, sometimes referred to as a "conventional vehicle"). Next, in Step 52, the rear vehicle B is captured by the rear view camera 6 of the vehicle A.

In Step 53, it is determined whether or not the rear vehicle B is a car capable of stopping its engine during travel. More specifically, pattern matching between the camera image of the rear vehicle B captured in Step 52 and a known vehicle forward captured image of an engine stoppable car (for example, the electric vehicle (EV), some hybrid vehicle (HV), or the like) during travel is performed by the ECU 2. In the case where the two images are matched, in Step 54, the BX is set to the "engine stoppable car", and the procedure skips to Step 65.

In Step 55, it is determined whether or not the rear vehicle B is a vehicle of which the friction loss of the engine is low (hereinafter, sometimes referred to as a "low friction car"), and pattern matching between the captured camera image of the rear vehicle B captured in Step 52 and a known vehicle forward captured image of the low friction car is performed by the ECU 2. In the case where the two images are matched, in Step 56, the BX is set to the "low friction car", and the procedure skips to Step 65.

In Step 57, it is determined whether or not the rear vehicle B is a vehicle of which the engine stops when the rear vehicle B stops (hereinafter, sometimes referred to as an "idling stop car"), and pattern matching between the captured camera image of the rear vehicle B captured in Step 52 and a known vehicle forward captured image of the idling stop car is performed by the ECU 2. In the case where the two images are matched, in Step 58, the BX is set to the "idling stop car", and the procedure skips to Step 65.

In Step 59, in the case where a high frequency sound of the inverter (in the case where the rear vehicle B is EV or the like) or an engine starting sound during the travel (in the case where the rear vehicle B is some HV or the like) of the rear vehicle B is sensed by the rear microphone 7 of the vehicle A, in Step 60, the BX is set to the "engine stoppable car", and the procedure skips to Step 65.

In addition, in Step 61, in the case where the engine starting sound is sensed by the rear microphone 7 just before the rear vehicle B starts to move, in Step 62, the BX is set to an idling stop car, and the procedure skips to Step 65.

In Step 63, a history of speed of the rear vehicle B is obtained from the outputs of the rear radar 8 and the speed sensor 3 of the vehicle A. When the speed is changed from deceleration to acceleration in the speed history, a change in speed is analyzed by the ECU 2, and in the case where it is checked that the probability of the delay (for example, 1 second) of the driving force that is the feature of the engine stoppable car such as an HV at the time of the start of the travel engine thereof is high (for example, 70%), in Step 64, the BX is set to the "engine stoppable car".

Figure 7:
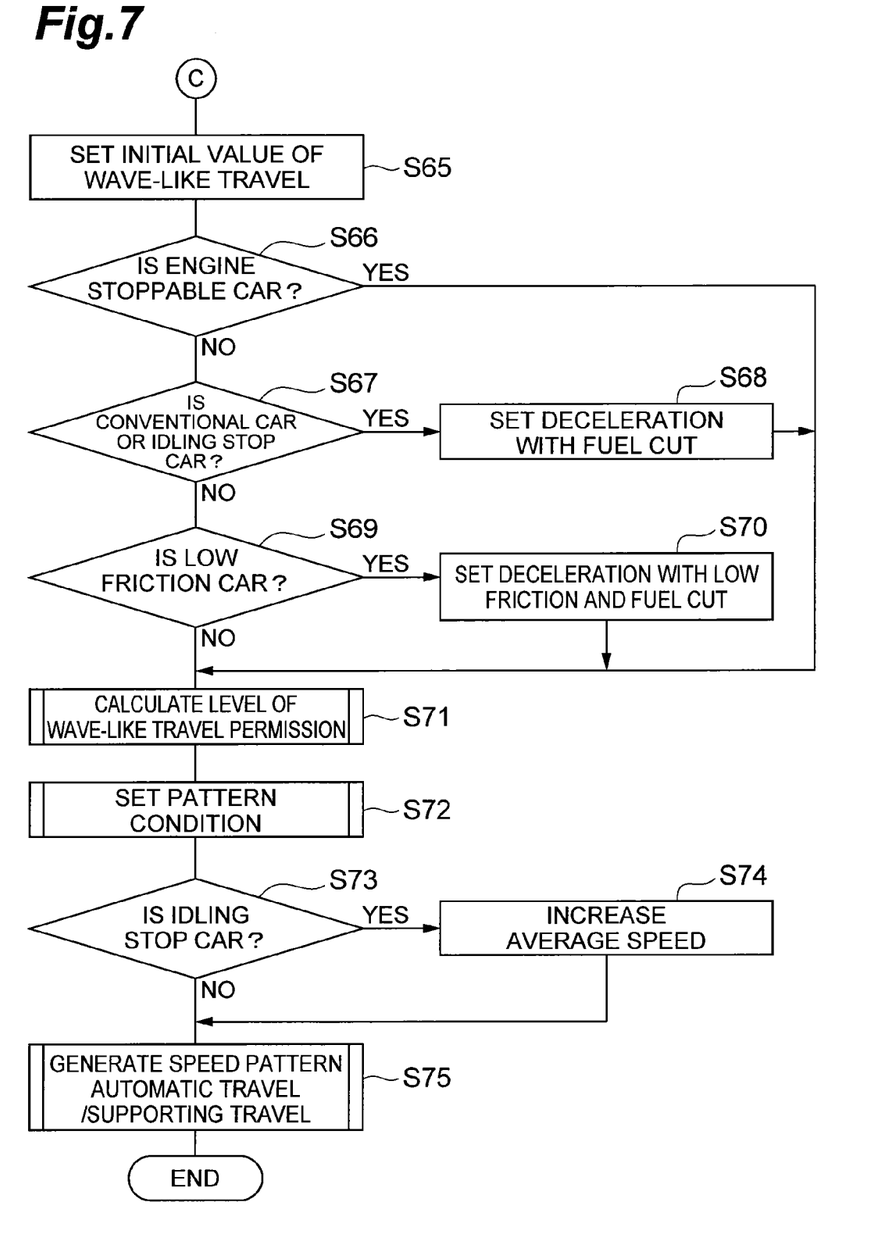
FIG. 7 is a flowchart illustrating the second half of the procedure of speed pattern generation according to the third embodiment of the invention.

In Step 65 illustrated in FIG. 7, similarly to Step 1 in FIG. 2, initial values of wave-like travel are set. Next, in Step 66, it is determined whether or not the BX is an engine stoppable car. In the case where the BX is the engine stoppable car, the procedure skips to Step 71.

In Step 67, it is determined whether or not the BX is a conventional car or an idling stop car. In the case where the BX is an conventional car or an idling stop car, in Step 68, the deceleration is set to deceleration with engine braking and fuel cut (for example, −0.06 G), and the procedure skips to Step 71.

In Step 69, it is determined whether or not the BX is a low friction car. In the case where the BX is a low friction car, in Step 70, the deceleration is set to deceleration with low friction, engine braking, and fuel cut (for example, −0.04 G), and the procedure skips to Step 71.

In Step 71, similarly to the processes of Steps 32 to 43, a level of wave-like travel permission is calculated. Next, in Step 72, similarly to the processes of Steps 15 to 22, a wave-like travel speed pattern condition is set. However, at this time, the deceleration is set to a rate in accordance with the change in Step 68 or 70 (in the case of a conventional car, the wave-like travel permission (low) is, for example, set to "0.03" for "0.01", and in the case where the initial value is, for example, three times, the wave-like travel permission is set to three times).

In Step 73, it is determined whether or not the vehicle is an idling stop car. In the case where the vehicle is an idling stop car, if the average speed is allowed to increase, the stop time interval of the rear vehicle B can be allowed to increase, so that low fuel consumption can be effectively achieved. Therefore, in Step 74, the amplitude is allowed to decrease (for example, by half), and the speed at the center of amplitude is allowed to increase by the amount corresponding to the decrease of the amplitude, so that the average speed is allowed to increase.

In Step 75, similarly to Step 23, a speed pattern is generated, and automatic travel or supporting travel is performed.

Fourth Embodiment

Figure 8:
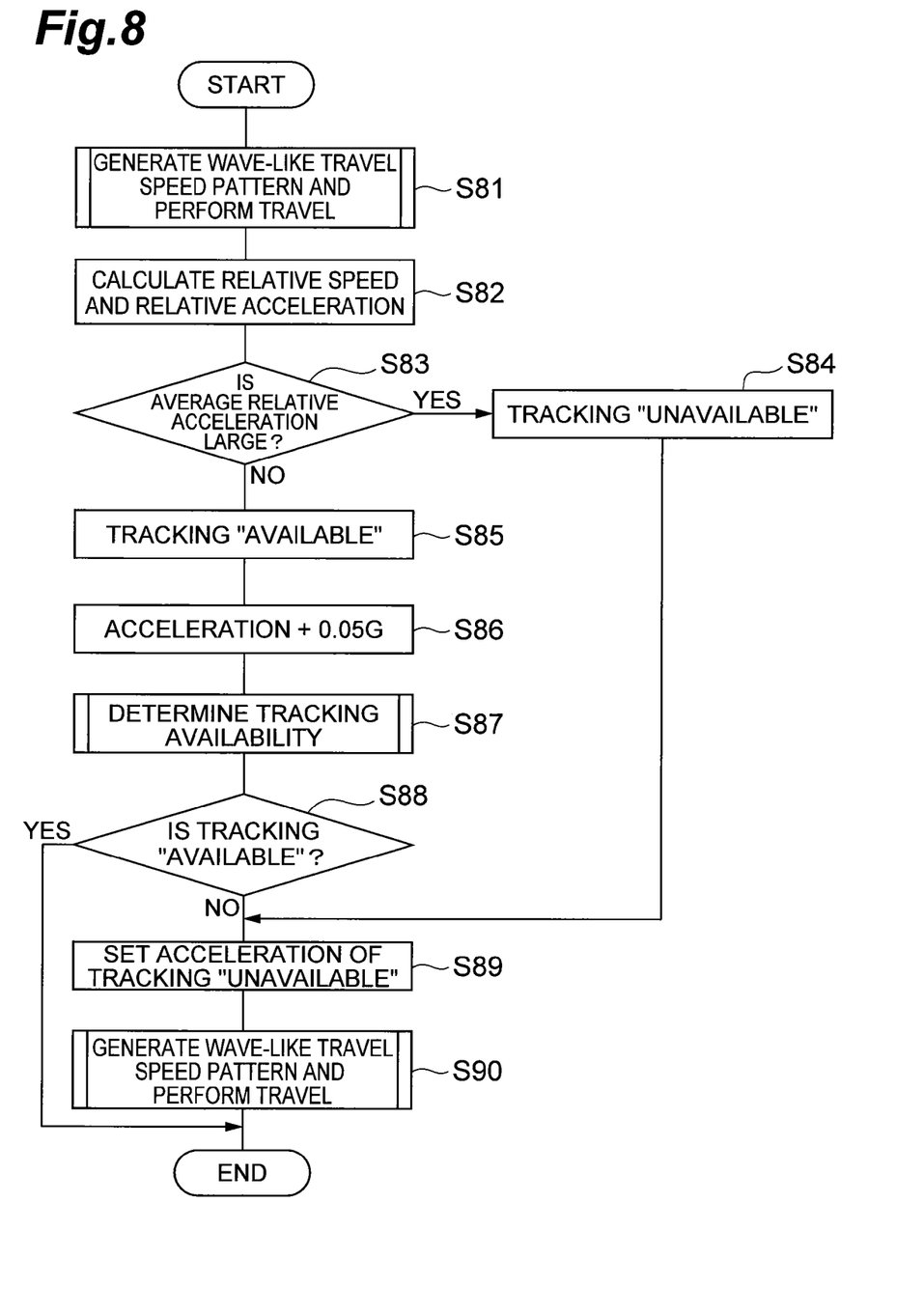
FIG. 8 is a flowchart illustrating a procedure of speed pattern generation according to a fourth embodiment of the invention.

A procedure of speed pattern generation according to a fourth embodiment of the invention will be described with reference to a flowchart of FIG. 8. The configuration of a vehicle control device according to a fourth embodiment of the invention is the same as that of the first embodiment illustrated in FIG. 1. In the speed pattern generation according to the fourth embodiment of the invention, the wave-like travel speed pattern where the degree (acceleration G, deceleration speed amplitude (acceleration/deceleration period), and the like) of wave-like traveling of the vehicle A is adjusted according to a tracking degree of the rear vehicle B with respect to the acceleration of the vehicle A is generated.

Firstly, in Step 81, similarly to the aforementioned first to third embodiments, the wave-like travel speed pattern of the vehicle A is generated, and the travel is performed. Next, in Step 82, in the acceleration section of the wave-like travel, the inter-vehicle distance between the vehicle A and the rear vehicle B is detected by the rear radar 8, and the tracking degree of the rear vehicle B with respect to the vehicle A is checked by the ECU 2. Next, the relative speed and the relative acceleration of one or both of the vehicle A and the rear vehicle B are calculated.

In Step 83, it is determined based on the tracking degree of the rear vehicle B with respect to the vehicle A checked in Step 82 or the relative speed and the relative acceleration of the vehicle A with respect to the rear vehicle B calculated in Step 82 whether or not the average relative acceleration of the vehicle A is more than a setting value in one acceleration section. In the case where the average relative acceleration is more than the setting value (for example, 0.03 G or more), in Step 84, the state of tracking availability (BY) of the rear vehicle B is set to "unavailable", and the procedure skips to Step 89. On the other hand, in the case where the average relative acceleration is less than the setting value, in Step 85, the BY is set to "available".

In Step 86, the acceleration condition of the vehicle A is allowed to increase (for example, 0.05 G) in comparison with Step 81, so that the wave-like traveling of the vehicle A is performed. Next, similarly to Steps 82 to 85, it is determined in Step 87 whether or not the state of tracking availability is available, and in the case where it is determined in Step 88 that the BY is "available", the process is ended.

In Step 89, the acceleration used in Step 81 or 86 is set to tracking unavailable acceleration (BZ). In Step 90, similarly to the aforementioned embodiments, a wave-like travel speed pattern is generated by using the BZ, and the travel is performed.

In this manner, in the vehicle control device 1 according to the embodiments, the travel situation of the rear vehicle B is checked, and the wave-like travel speed pattern of the vehicle A is generated based on the travel situation of the rear vehicle B, so that the traveling of the vehicle can be controlled by using the wave-like travel speed pattern by taking into consideration the travel situation of the rear vehicle B. Therefore, it is possible to achieve the traveling of the vehicle A with very low fuel consumption.

The invention is not limited to the aforementioned embodiments. For example, the vehicle A or the rear vehicle B is not limited to ordinary vehicles, but it may be a heavy truck, a bus, or the like. In addition, it may be a two-wheeled vehicle such as a motorcycle.

INDUSTRIAL APPLICABILITY

According to the invention, the wave-like travel speed pattern is generated by taking into consideration the travel situation of the rear vehicle, so that it is possible to provide a vehicle control device capable of achieving traveling of a vehicle with very low fuel consumption.

REFERENCE SIGNS LIST

1: vehicle control device, 2: ECU, 3: speed sensor, 4: navigation system, 5: G sensor (road surface gradient information acquiring means), 6: rear view camera (rear vehicle type information acquiring means), 7: rear microphone (rear vehicle type information acquiring means), 8: rear radar (rear vehicle travel situation checking means), 9: operating unit.

The invention claimed is:

1. A vehicle control device which generates a speed pattern of a vehicle and controls traveling of the vehicle based on the speed pattern, comprising:
    rear vehicle travel situation checking unit for checking a travel situation of a rear vehicle which travels behind the vehicle;
    wave-like travel speed pattern generating unit for generating a wave-like travel speed pattern where acceleration travel and free run travel are alternately repeated based on the travel situation of the rear vehicle; and
    control unit for controlling the traveling of the vehicle based on the wave-like travel speed pattern,
    wherein the wave-like travel speed pattern generating unit adjusts a degree of the wave-like travel of the vehicle according to a stability of the travel situation of the rear vehicle.

2. The vehicle control device according to claim 1, further comprising road surface gradient information acquiring unit for acquiring road surface gradient information of a predetermined section where the vehicle travels,
    wherein the wave-like travel speed pattern generating unit generates the wave-like travel speed pattern based on the road surface gradient information.

3. The vehicle control device according to claim 1, further comprising rear vehicle type information acquiring unit for acquiring type information of the rear vehicle,
    wherein the wave-like travel speed pattern generating unit generates the wave-like travel speed pattern based on the type information of the rear vehicle.

4. The vehicle control device according to claim 1, further comprising rear vehicle tracking degree checking unit for checking a tracking degree of the rear vehicle with respect to the vehicle based on the travel situation of the rear vehicle,
    wherein the wave-like travel speed pattern generating unit determines a degree of acceleration of the acceleration travel according to the tracking degree of the rear vehicle and generates the wave-like travel speed pattern.

5. The vehicle control device according to claim 1, further comprising:
    relative speed calculating unit for calculating a relative speed between the vehicle and the rear vehicle based on the travel situation of the rear vehicle; and
    tracking availability determining unit for determining tracking availability of the rear vehicle to the vehicle based on the relative speed,
    wherein the wave-like travel speed pattern generating unit generates the wave-like travel speed pattern based on the tracking availability.

6. A vehicle control device which generates a speed pattern of a vehicle and controls traveling of the vehicle based on the speed pattern, comprising:
    rear vehicle travel situation checking means for checking a travel situation of a rear vehicle which travels behind the vehicle;
    wave-like travel speed pattern generating means for generating a wave-like travel speed pattern where acceleration travel and free run travel are alternately repeated based on the travel situation of the rear vehicle; and
    control means for controlling the traveling of the vehicle based on the wave-like travel speed pattern,
    wherein the wave-like travel speed pattern generating means adjusts a degree of the wave-like travel of the vehicle according to a stability of the travel situation of the rear vehicle.

7. The vehicle control device according to claim 6, further comprising road surface gradient information acquiring means for acquiring road surface gradient information of a predetermined section where the vehicle travels,
    wherein the wave-like travel speed pattern generating means generates the wave-like travel speed pattern based on the road surface gradient information.

8. The vehicle control device according to claim 6, further comprising rear vehicle type information acquiring means for acquiring type information of the rear vehicle,
    wherein the wave-like travel speed pattern generating means generates the wave-like travel speed pattern based on the type information of the rear vehicle.

9. The vehicle control device according to claim 6, further, comprising rear vehicle tracking degree checking means for checking a tracking degree of the rear vehicle with respect to the vehicle based on the travel situation of the rear vehicle,
    wherein the wave-like travel speed pattern generating means determines a degree of acceleration of the acceleration travel according to the tracking degree of the rear vehicle and generates the wave-like travel speed pattern.

10. The vehicle control device according to claim 6, further comprising:
    relative speed calculating means for calculating a relative speed between the vehicle and the rear vehicle based on the travel situation of the rear vehicle; and
    tracking availability determining means for determining tracking availability of the rear vehicle to the vehicle based on the relative speed,
    wherein the wave-like travel speed pattern generating means generates the wave-like travel speed pattern based on the tracking availability.

* * * * *